Figure 1:
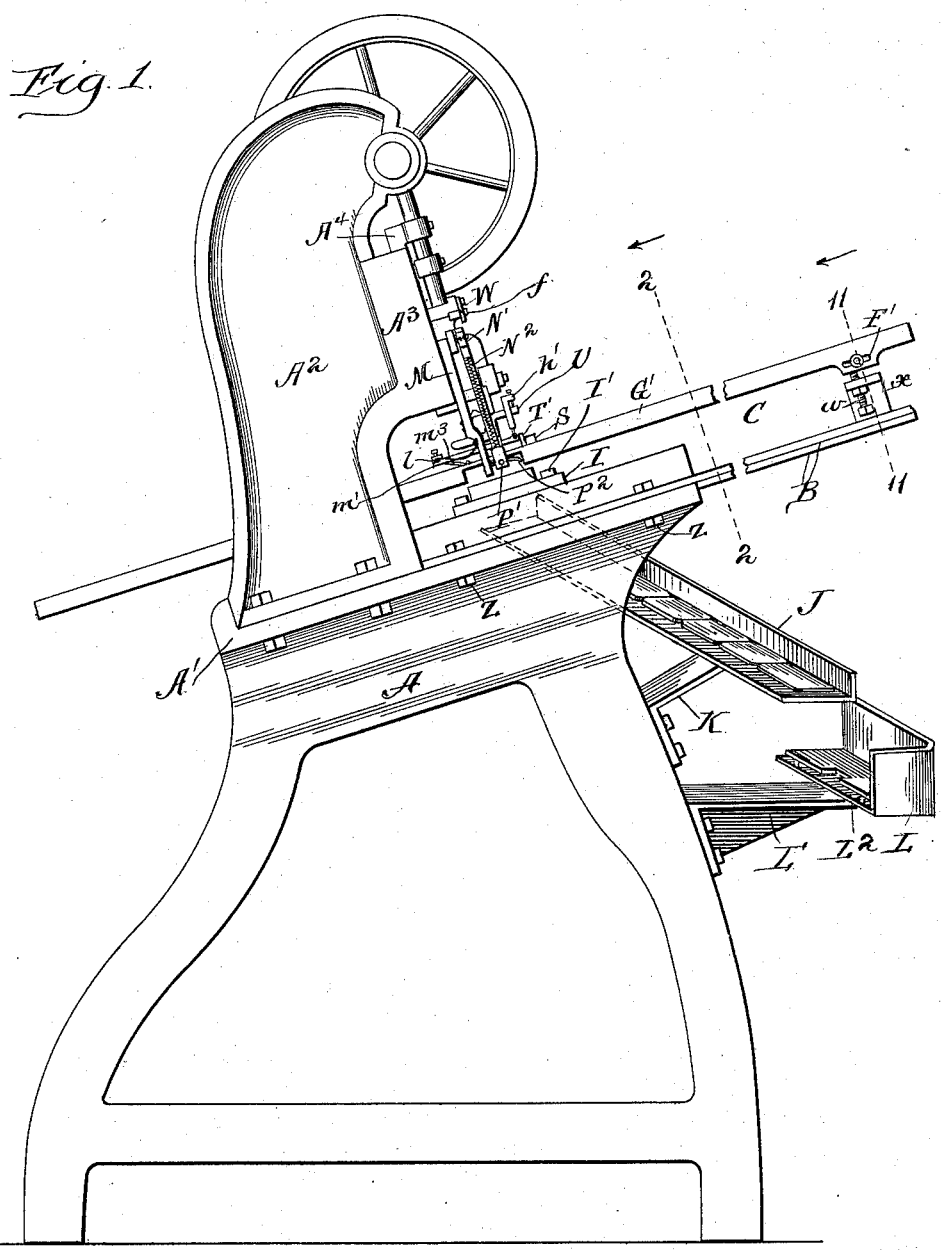

No. 609,119. Patented Aug. 16, 1898.
L. OTTO.
MACHINE FOR STAMPING CARDS FROM BLANKS.
(Application filed Mar. 8, 1897.)
(No Model.) 6 Sheets—Sheet 1.

Witnesses
W. C. Coelies
Martin H. Olsen

Inventor:
Louis Otto,
By Dyrenforth & Dyrenforth,
Atty's

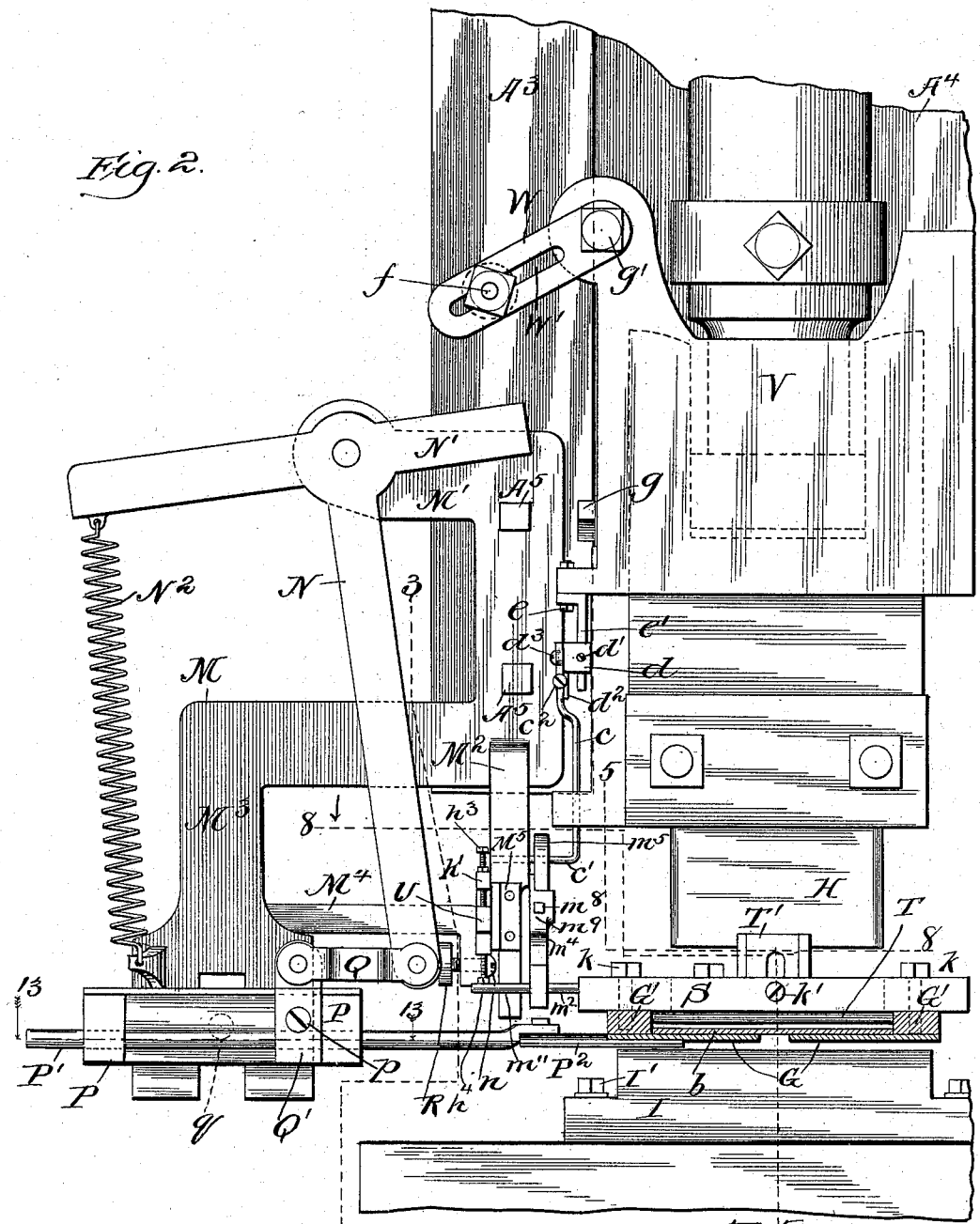

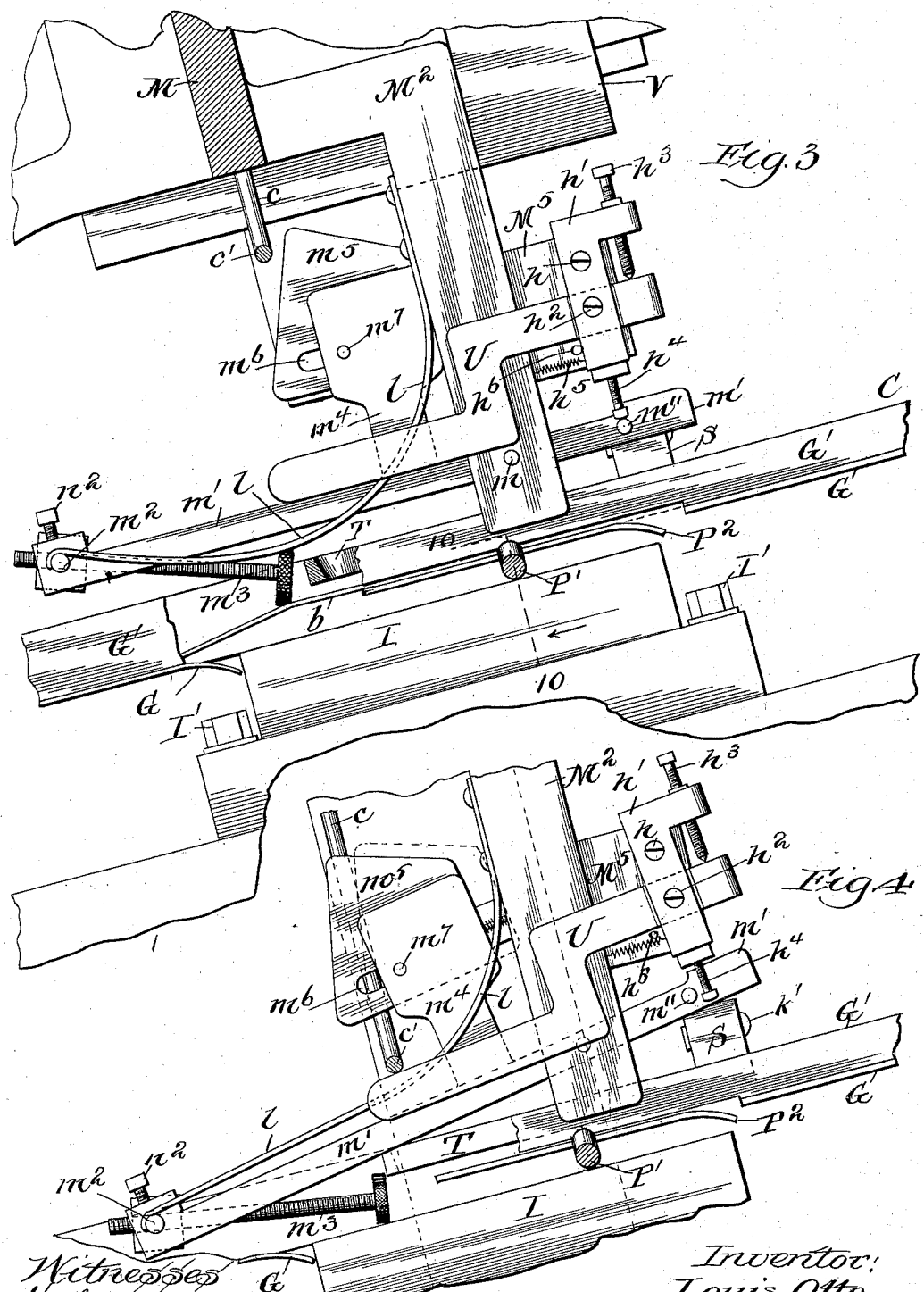

No. 609,119. Patented Aug. 16, 1898.
L. OTTO.
MACHINE FOR STAMPING CARDS FROM BLANKS.
(Application filed Mar. 8, 1897.)
(No Model.) 6 Sheets—Sheet 4.
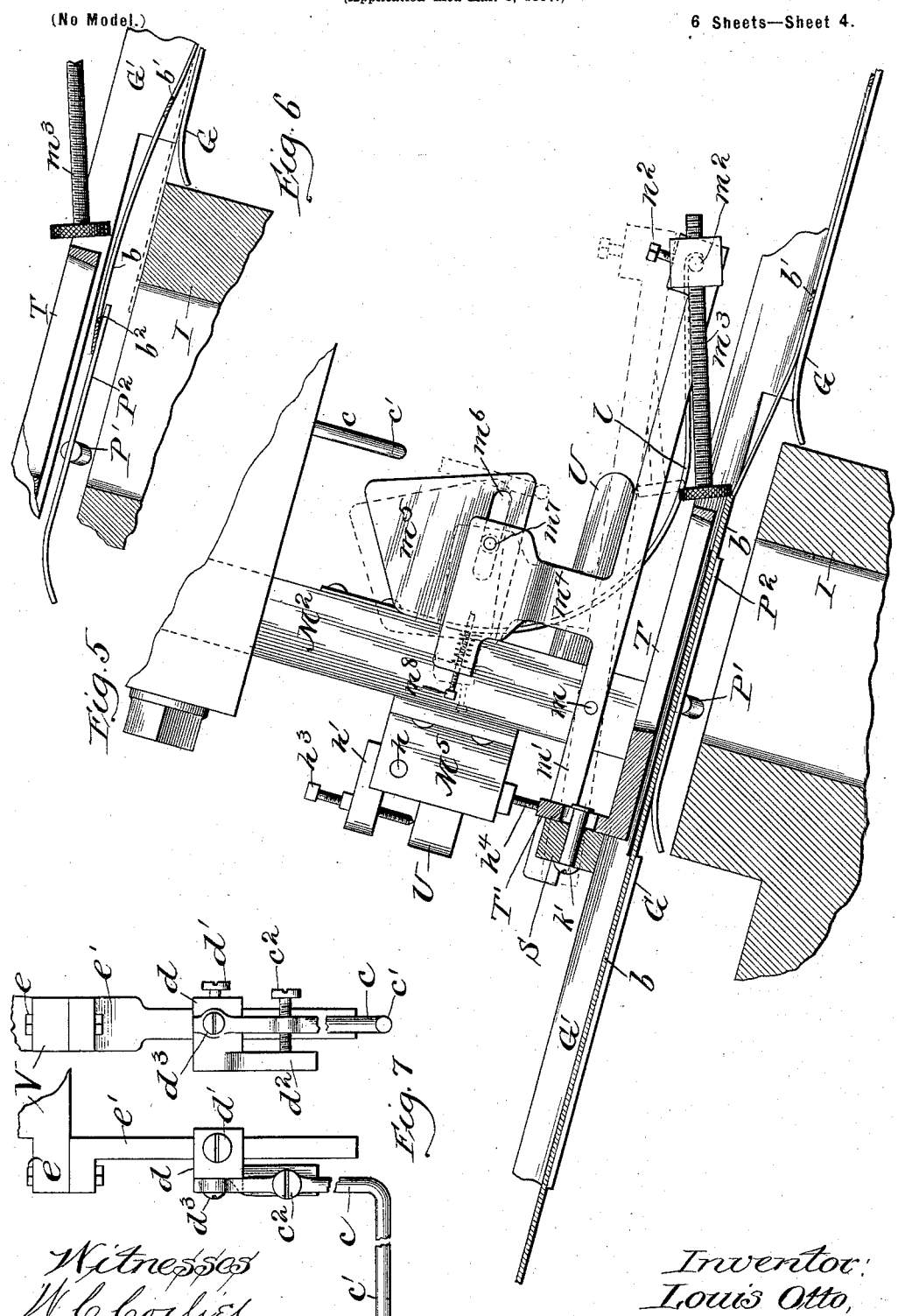
Witnesses
W. C. Coolies
Martin H. Olsen
Inventor:
Louis Otto,
By Dyrenforth & Dyrenforth,
Atty's

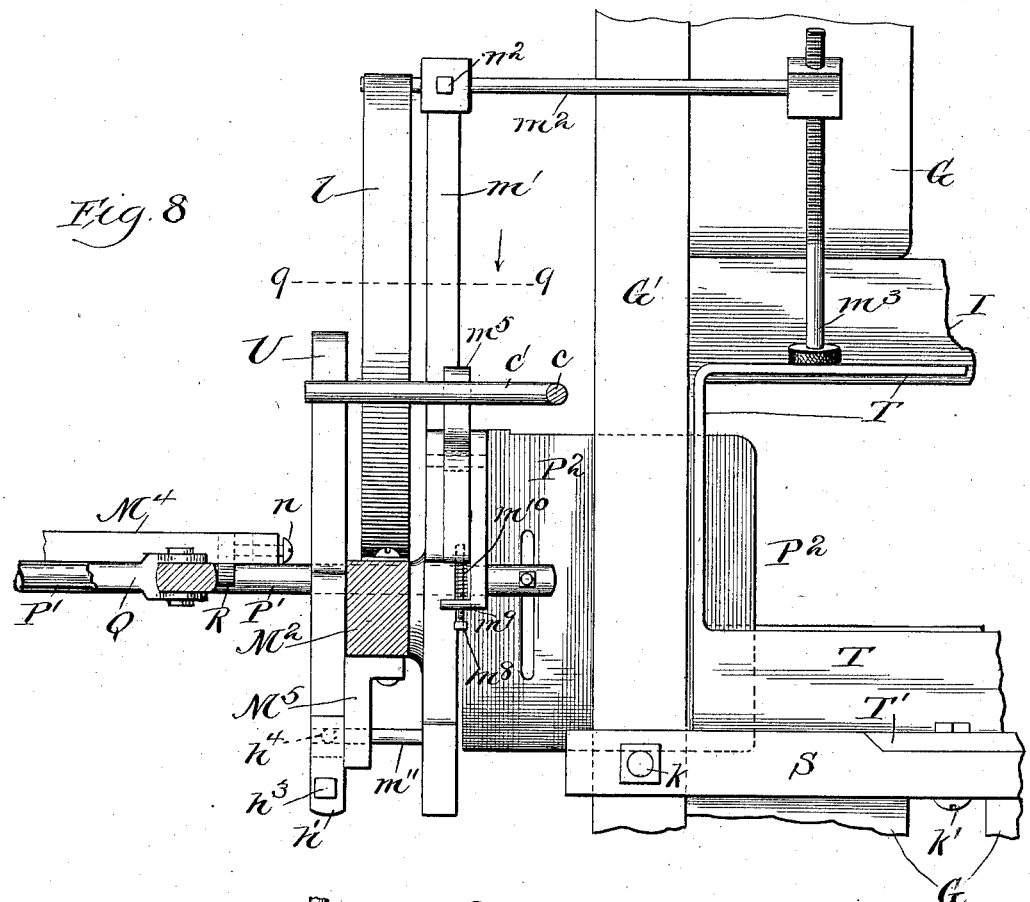
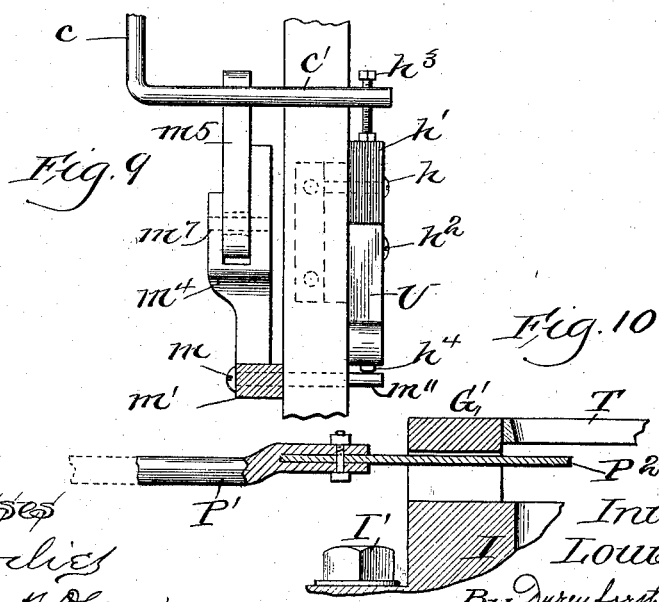

No. 609,119. Patented Aug. 16, 1898.
L. OTTO.
MACHINE FOR STAMPING CARDS FROM BLANKS.
(Application filed Mar. 8, 1897.)
(No Model.) 6 Sheets—Sheet 6.
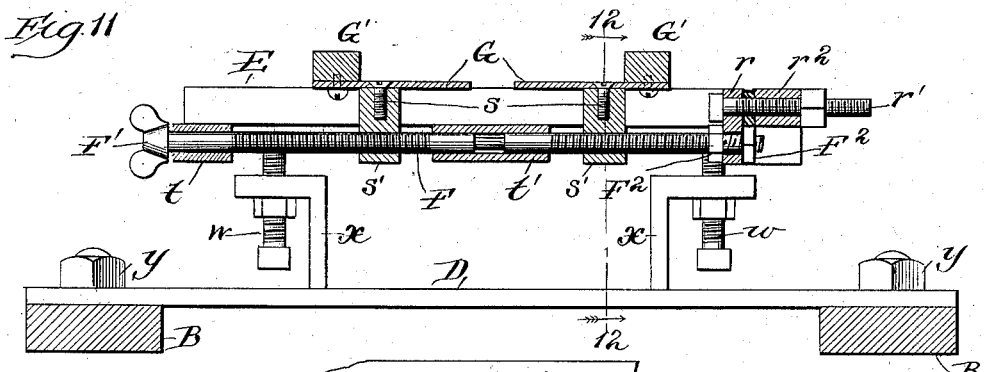
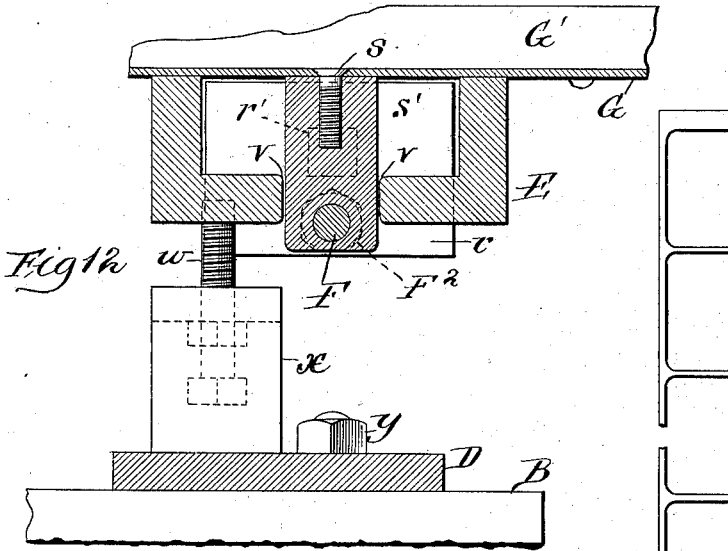
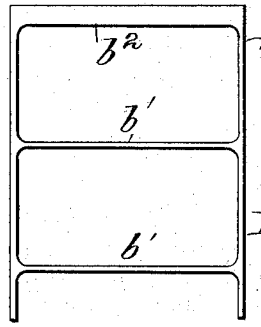
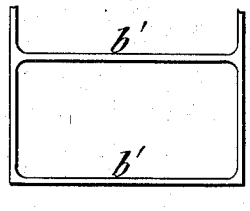
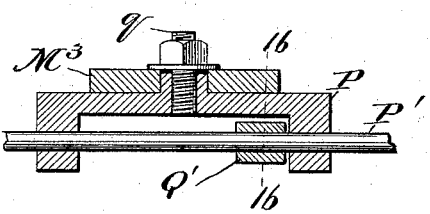
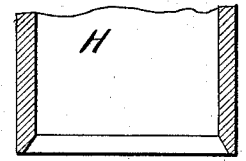
Witnesses
W. C. Coolies
Martin H. Olsen
Inventor:
Louis Otto,
By Dyrenforth & Dyrenforth,
Atty's

UNITED STATES PATENT OFFICE.

LOUIS OTTO, OF CHICAGO, ILLINOIS, ASSIGNOR, BY DIRECT AND MESNE ASSIGNMENTS, TO THE WALKER OTTO COMPANY, OF SAME PLACE.

MACHINE FOR STAMPING CARDS FROM BLANKS.

SPECIFICATION forming part of Letters Patent No. 609,119, dated August 16, 1898.

Application filed March 8, 1897. Serial No. 626,443. (No model.)

*To all whom it may concern:*

Be it known that I, LOUIS OTTO, a citizen of the United States, residing at Chicago, in the county of Cook and State of Illinois, have invented a new and useful Improvement in Machines for Stamping Cards from Blanks, of which the following is a specification.

My invention relates to an improvement in machines for cutting or stamping cards from blanks, and more particularly to means for automatically feeding the blank to the die where the card is stamped out and for discharging the remnant of the card-blank from the machine to admit a new blank to the die in time to prevent loss of a stroke at the moment of the introduction of a new blank.

My object is to simplify greatly the feeding mechanism for card-making machines and to overcome the objectionable feature of missing a stamp at the moment of introducing a new blank to the die, which latter is a matter of the greatest importance when it is considered that in cutting large-sized cards this loss may amount to fully twenty-five per cent. of the capacity of the machine.

In accomplishing the above results I make use of a gravity-feed, which allows the necessary moving mechanism to be simplified greatly. The device may be used on the ordinary form of stamping-machine, in which case the frame of the machine is blocked upon the feed side to secure the necessary slant; but preferably the frame is so constructed as to give the necessary inclination to the feed-chute and die.

A further object of the invention is to provide an improved discharge-chute for the cards.

The full description given below will be understood more readily by keeping in mind that the card-blank (strip of card material) slides down an inclined chute by force of gravity, is guided over the die-opening by a supporting-plate, is arrested at the right position for stamping by a movable stop, and that it is necessary to provide mechanism for withdrawing said supporting-plate before the stamping-tool reaches the die and to raise said movable stop to permit the portion of the card-blank below the perforation last made to pass the stop preparatory to bringing a new section of the blank above the die.

In the accompanying drawings, Figure 1 is a view in side elevation of a card-making machine embodying my invention; Fig. 2, an enlarged broken section taken on line 2 of Fig. 1, the lower and left-hand portions of the machine being broken away; Fig. 3, a broken partially-sectional side elevation taken on line 3 of Fig. 2 and viewed in the direction of the arrow and showing the movable stop in its raised position; Fig. 4, a similar view showing the stop in its released position; Fig. 5, a broken central longitudinal section taken on line 5 of Fig 2 and viewed in the direction of the arrow; Fig. 6, a broken sectional detail of the die-plate, movable stop, stripper, and a portion of a blank-remnant being discharged from the machine; Fig. 7, side and plan views (seen in side and end views of the machine) of a detail; Fig. 8, a broken plan section taken on line 8 of Fig. 2 and viewed in the direction of the arrow; Fig. 9, a broken section on line 9 of Fig. 8; Fig. 10, a broken sectional detail of the withdrawable supporting-plate, showing the manner of its insertion above the die-plate and beneath the stripper; Fig. 11, an enlarged sectional detail of the feed-chute and its adjusting mechanism, the section being taken on line 11 of Fig. 1; Fig. 12, a still further enlarged broken section of the same, taken on line 12 of Fig. 11; Fig. 13, a broken sectional detail of the guide for the rod carrying the withdrawable supporting-plate, the section being taken on line 13 of Fig. 2; Fig. 14, a broken plan view of the perforated card blank or remnant discharged from the machine; Fig. 15, a broken vertical section of the punching-die or stamping-tool; and Fig. 16 a sectional detail of the adjustable clamp for the actuating-rod of the supporting-plate, the section being taken on line 16 of Fig. 13 and viewed in the direction of the arrow.

A is the supporting-frame, preferably constructed to give a suitable slant to its top A', to which are secured the housings A², which carry the stamping-tool and actuating mechanism therefor, all of which may be of any ordinary construction.

To the top of the frame A are secured, one on each side of the machine, flat supporting-strips B, as by means of bolts $z$. Adjustably supported upon said strips is a relatively long feed-chute C, adapted to receive strips of card-blank and affording a channel down which the card-blanks slide, being regulated in their descent by mechanism to be hereinafter described. Figs. 11 and 12 show the means by which the chute is made adjustable to give a varying inclination and to receive blanks of varying sizes. Upon the supporting-bars B and secured thereto by bolts $y$ is a cross-bar D, which carries rigid angle-bars $x$, which may be integral with the bar D. Extending crosswise of the chute-support and supported by adjusting-bolts $w$ is a channel-bar E, provided in its web portion with a slot $v$, which extends throughout the length of the channel-bar with the exception of small connecting-sections $t t'$, affording bearings for a double-threaded bolt F. The angles of the channel-bar extend upward and afford surfaces upon which slide movable strips G, provided with angles or side bars G', which form the feed-chute proper. To the strips G are secured, as by screws $s$, lugs $s'$, adapted to move in the slotted channel-bar and internally provided with opposite threads to receive the double-threaded screw F. The screw F is provided at one end with a rigidly-attached thumb-piece F' and at its opposite end is rotatably joined to an upwardly-extending lug $r$, which is adjustably connected by an adjusting-bolt $r'$ to a piece $r^2$, rigid with the channel-bar. The bolt F is provided with rigid collars $F^2$, which embrace the lug $r$, and one or the other of these collars receives the end thrust of the bolt according to the direction in which it is turned in separating or bringing together the sides of the chute. The position of the chute as a whole can evidently be changed (moved in either cross-direction) by regulating the position of the lug $r$ through the medium of the adjusting-bolt $r'$. A nice adjustment of the inclination, as well as a leveling in a cross-direction, is secured by the bolts $w$. Toward its lower end the chute is provided with precisely similar adjusting mechanism, which in Fig. 1 is hidden by the housing of the machine and which it is deemed conducive to clearness to omit from the details, as it would involve a repetition merely.

The housings $A^2$ are provided with a guide $A^3$, within which moves a cross-head $A^4$ (see Fig. 2) in an ordinary manner. The cross-head carries a stamping-tool or male die H, which conforms to the shape of the card or metal, as the case may be, to be stamped. Fig. 15 shows a broken section of the preferred form of stamping-tool. Secured to the top of the machine-frame by bolts I' is a die I, through which the cards are punched and from whence they fall into a trough J, (shown in perspective in Fig. 1,) secured to the frame by a suitable brace K. The trough J slants downwardly and to the right, and to permit the passage of different-sized cards is preferably supplied with a side piece on its lower side only. Beneath the lower end of the trough J is a collecting-box L, placed at the same angle as the former and provided with an end piece, against which the cards impinge. This box is secured to the frame by a suitable brace L', and is supplied with a false bottom or shelf $L^2$, which has a small section removed for ease in grasping and removing the cards when a sufficient number have collected.

For the purpose of supporting the movable tongue or supporting-plate above referred to and certain other of the movable parts an attachment M is rigidly secured to one side of the guide $A^3$ (see Fig. 2) by means of bolts $A^5$. This attachment is provided at its upper part with an arm M', on which is pivoted a bell-crank lever N, having an inward projecting arm N'. Toward its lower end the attachment projects laterally, as shown, and is provided at the curve with a forward and downward projecting branch arm $M^2$ and at the end of the lateral projection with a downward extension $M^3$. Rigidly secured to the lower end of the extension $M^3$, as by a vertically-adjustable bolt $q$, is a guide P, (see Fig. 13,) within which moves an actuating-rod P' for a movable tongue or supporting-plate $P^2$, curved downward at its forward side to project beneath the plane of the strips G of the feed-chute, as clearly shown in Fig. 5. The tongue $P^2$ is itself adjustable on the actuating-rod P', as shown in Fig. 8. Pivotally connected with the lower end of the bell-crank N by a link Q, Figs. 2 and 16, is a clamp Q', provided with a perforation to receive the actuating-rod P' of the movable tongue, which is tiltably and longitudinally adjustable therein by means of a clamping-screw $p$. The lower arm of the bell-crank lever N is held normally against a stop R, adjustably connected to a branch arm $M^4$ of the downward extension $M^3$, as by means of a screw $n$, by a spring $N^2$, attached to the outer arm of the bell-crank and to the branch arm $M^3$, and thus holds the movable tongue normally above the die-opening to support the card-blank in its movement across the same.

The downward sliding of the card-blank is arrested at the proper moment by a movable stop. To the lower end of the branch arm $M^2$ of the attachment M is pivoted at $m$ (see Figs. 3 and 8) a lever $m'$, which carries at its rear end an inwardly-projecting rod $m^2$, secured by a set-screw $n^2$, which in turn carries an adjustable stop $m^3$. Attached to the same end of the lever $m'$ is one end of a spring $l$, whose opposite end is fastened to the branch arm $M^2$ by means of rivets, as shown, and which thus tend normally to hold the stop $m^3$ down upon the die-plate.

Figs. 2 and 5 show immediately below and in front of the punch H a bar S, secured to the side pieces G' of the chute by bolts $k$, which carries a stripper T, provided with a slotted upward extension T' for vertical adjustment by means of a bolt $k'$.

There remains to be described the means by which the stop $m^3$ is actuated to allow the passage of the narrow strip of material below the perforation, when made, to bring a new section of the card material beneath the punch, and when the last card has been punched from a blank to allow of the passage of both the strip just mentioned and the small strip above the last perforation to admit a new blank to the die, and also the means for withdrawing the supporting-plate $P^2$ before the punch reaches it in the downward descent.

The lever $m'$ is provided back of the pivotal point $m$ with an upward extension affording a bifurcated guide $m^4$, Fig. 9, within which moves a slide $m^5$, provided with a slot $m^6$ to receive a pin $m^7$ and provided at its front end with a forward-projecting guide-pin $m^8$, Fig. 8, which plunges in a perforation in a laterally-projecting end piece $m^9$ of the guide, and which is surrounded by a coiled spring $m^{10}$, confined between the end piece and the slide. The rear end of the slide slants downwardly and rearwardly and forms an angle with the bottom of the slide, which is preferably slightly rounded off, as shown in Fig. 5. At its front end the lever $m'$ is provided with a laterally-projecting pin $m^{11}$. The branch arm $M^2$ is provided with a forward projection $M^5$, (see Fig. 4,) to which is attached, by means of a pivotal screw $h$, a small bell-crank lever $h'$, to whose downward-extending arm is attached, by means of a pivotal screw $h^2$, a bent lever U, and whose forward-projecting arm is provided with an adjusting-screw $h^3$, which bears upon the front end of the lever U. The small bell-crank $h'$ is provided on its downward-extending arm with an adjustable bolt or set-screw $h^4$, which in one position of the lever $m'$ rests upon the pin $m^{11}$ and holds the stop $m^3$ off the die-plate. It is drawn to this position by a small spring $h^5$, attached to the lower end of the bell-crank $h'$ and to the arm $M^2$, its movement in this direction being limited by a stud $h^6$ on the part $M^5$.

To the cross-head $A^4$, Fig. 2, is secured an attachment V, which fits over the front of the cross-head and embraces the edges thereof and is tightened thereon by a set-screw $g$. Secured to the upper part of the attachment V by a bolt $g'$ and capable of receiving any desired inclination is a link W, provided with a slot W', in which is adjustably secured a trip-bolt $f$, which projects above the branch arm N' of the bell-crank N. Secured to the lower part of the attachment V by a bolt $e$ is a small angle-shaped piece $e'$, over the downward-extending portion of which fits an adjustable slide $d$, Fig. 7, secured by a set-screw $d'$. The slide $d$ is provided at the outer side with a downward-depending lug $d^2$ and has pivotally connected to it, by means of a pivotal screw $d^3$, a trip-rod $c$, provided with a lateral projection $c'$ and capable of being adjusted to any desired forward inclination by means of a set-screw $c^2$, which bears against the lug $d^2$.

As shown most clearly in Figs. 3 and 8, the movable tongue or plate $P^2$ is so situated as to leave a space between its lower edge and the head of the movable stop $m^3$, and it should be added that the functions of the plate $P^2$ are, first, to insure the correct passage of the blank across the die-opening, in this capacity virtually acting as a continuation of the inclined feed-chute, and, second, to support the blank a small distance above the die-plate at the time that the movable stop itself is supported above the die-plate, as shown in Fig. 3, so that the card-blank remnant can escape from the machine, as hereinafter explained in the description of the operation of the machine. It will appear that the essential thing about this feature of my invention is that the card-blank shall rest upon or be guided to the die in one plane and that there shall be an offset or depression beneath or outside of that plane and below the upper or outer edge of the die-opening into which the strip above the last perforation can drop and pass beneath or avoid the stop, which at that instant is located above the bottom of said depression—that is to say, an important feature of my invention resides in rendering every stroke of the die effective for cutting a card from the blank. To permit this to be accomplished, it is essential that the terminal portion of the remnant shall not, like the preceding portions, be obstructed by the stop, but shall pass by it and be discharged, thus permitting the forward end of the succeeding blank to engage the stop without delay. This result may be brought about by various mechanical agencies which will readily suggest themselves to skilled mechanics. The one which I employ, broadly defined, consists in providing adjacent to the stop an offset or depression in the surface over which the blank moves on its way to the discharge, so that upon reaching this depression the terminal portion of the remnant, not being sustained by any succeeding portion of the blank, drops into it, thus clearing the stop and passing without obstruction to the discharge. I do not, however, wish to be understood as limiting myself by my claims to this particular type of device for effecting the desired clearance, it being only necessary in order to be within the spirit of this feature of my invention to provide some suitable agency by which the stop shall miss engagement with the terminal portion of the remnant, and thus accomplish the object sought.

It would be quite possible to accomplish the object sought without providing the double movement for the stop $m^3$ above referred to, and so far as this feature of preventing the loss of a stroke is concerned I do not limit myself to the inclined chute.

The expression "surface over which the blank moves on its way to the discharge" as used in the appended claims is meant to cover the combined feed-chute proper and the movable tongue virtually forming a continuation thereof, or the equivalent of these combined members where they are replaced—as, for instance, by lowering the feed-chute to the plane of the die-plate and allowing the die-plate itself to perform in a degree the function of the movable tongue. Such an arrangement indeed would be possible by giving to the feed-chute a steeper inclination to insure the passage of the blank across the die-opening without its catching on the boundaries of the opening.

The operation is as follows: A card-blank $b$, the appearance of which after perforation is shown in Fig. 14, is introduced into the feed-chute C and slides down till it rests against the stop $m^3$, being supported in its passage across the die-opening by the movable tongue $P^2$. (See Fig. 5.) In the descent of the stamping-tool the horizontal portion $c'$ of the trip-rod $c$ presses upon the inclined rear edge of the slide $m^5$, forcing the latter forward against its spring, by the resilience of which the slide is forced back with its angle projecting across the path of the trip-rod after the latter has passed the slide. In the further downward movement the trip-rod presses upon the rear end of the lever U, and thereby frees the pin $m^{11}$ from engagement with the set-screw $h^4$, when the stop immediately falls upon the die-plate. Almost simultaneous with the fall of the stop the branch arm N' of the bell-crank N is engaged by the trip-bolt $f$, forcing it down and withdrawing the supporting-plate $P^2$ from beneath the card-blank, thus allowing the latter to drop upon the die-plate, where it is struck by the stamping tool or punch, and the card is cut from the card-blank and forced through the die, dropping into the discharge-chute J. As the cards fall into the discharge-chute they are swung by gravity to a position longitudinally of the chute and against the lower side thereof, along which they slide till discharged in an orderly pile into the collecting-box L, from which they may be removed readily by grasping them between the thumb and fingers, this being facilitated by the recessed false bottom $L^2$. In the up movement of the stamping-tool the card-blank is raised by said tool till engaged by the stripper. The bell-crank N, relieved of the downward pressure of its trip-bolt, flies back and carries the supporting-plate beneath the card-blank, and the slide $m^5$ on the stop-carrying lever $m'$ is raised by the trip-rod $c$ till it assumes such an angle as to cause it to be forced forward slightly against its spring, when the trip-rod slips by and permits the stop to fall to the position shown in Fig. 5. At about the instant that the stop $m^3$ on the lever $m'$ is at its highest position, as shown in dotted lines, Fig. 5, the card-blank, released by the stripper T, drops upon the tongue $P^2$ and resumes its sliding movement, so that the small strip $b'$ just below the perforation has time to pass the path of the stop before the latter can drop to the position shown in Fig. 5. Before the new card-section, however, can traverse the distance across the die-opening the stop has reached the position shown in full lines in the figure last mentioned and is in the path of the blank to arrest its downward movement at the proper moment, and this brings us to a repetition of the movement. When the last card is punched from the blank, the strip below the perforation passes the stop precisely in the manner just described. The strip above the perforation, however, does not reach the path of the stop till after the latter has dropped to the position shown in full lines in Fig. 5, and here it is that the space between the lower edge of the supporting-plate $P^2$ and the path of the stop $m^3$ performs the important function of allowing the blank remnant to escape from the machine, and this would happen so long as the strip above the last perforation was narrow enough to drop through the gap or space mentioned. It therefore appears that the cross adjustment of the tongue $p^2$ upon its actuating-rod permits its accommodation to blanks of varying length and which may therefore have strips of varying width above the last perforation.

It will be understood that it would be possible with flexible material to depend upon the increased limberness of the perforated part of the blank to permit the strip below the perforation by dropping down to pass the stop even while it is in the position shown in Fig. 5; but this would be an unreliable mode of operation, and for this reason the stop is given the larger traverse described above.

It will be understood that this machine is not limited in its application to punching cards from cardboard, but may be used in punching plates from any suitable material, as tin or other light sheet metal.

The function of the various adjustments of the machine will occur to the mechanic, and it is deemed unnecessary to describe them further otherwise than to say that the action of the various parts may be timed by them readily and the machine adapted to varying work.

Various changes in the details of construction may be made without departing from the spirit of my invention, and I desire to be understood as in no sense limiting myself by the particular description given above.

What I claim as new, and desire to secure by Letters Patent, is—

1. A machine for stamping out cards from a card-blank strip, comprising, in combination, frame, die, stamping-tool, an inclined card-blank feed-chute leading to the die of sufficient inclination to cause the blank to be fed by the action of gravity alone, and an intermittently-actuated stop for checking the downward movement of the blank preparatory to the stamping out of a card, substantially as and for the purpose set forth.

2. A machine for stamping out cards from a card-blank strip, comprising, in combination, frame, die, stamping-tool, an inclined card-blank feed-chute leading to the die of sufficient inclination to cause the blank to be fed by the action of gravity alone, and an automatically-operated stop for checking the downward movement of the blank preparatory to the stamping out of a card, substantially as and for the purpose set forth.

3. In a machine for stamping out plates from a blank, the combination with the frame, die and stamping-tool, of a gravity-operating chute for feeding the blank to the dies, a stop for checking the movement of the blank during the stamping operation, and means for causing the final portion of the remnant automatically to clear the stop, whereby the introduction of a new blank is permitted in time to prevent loss of a stroke, substantially as described.

4. In a machine for stamping out plates from a blank, the combination with the frame, die, and stamping-tool, of a gravity-operating chute for feeding the blank to the dies, a stop in the discharge-path for checking the movement of the blank during the stamping operation, mechanism for effecting the intermittent displacement of the stop to cause it to clear the adjacent portion of the remnant and reëngage the blank, and means for causing the final portion of the remnant automatically to clear the stop, whereby the introduction of a new blank is permitted in time to prevent loss of a stroke, substantially as described.

5. In a machine for stamping out plates from a blank, the combination with the frame, die, and stamping-tool, of a gravity delivery-chute leading to the die, an intermittently-actuated stop below the die-opening having its traverse extending into the path of the card-blank, and an offset or depression adjacent to the stop in the surface over which the blank passes on its way to the discharge, said depression operating to permit the blank-remnant to escape from the machine while said stop obstructs the passage of a new blank, substantially as and for the purpose described.

6. In a machine for stamping out plates from a blank, the combination with the frame, die, and stamping-tool, of an inclined feed-chute for the blanks leading to the die, an automatically-operated stop whose traverse intersects the path of the blank, and a depression in the surface over which the blank passes on its way to the discharge, operating to permit the escape of the remnant while the stop is in a position to check the passage of a new blank, substantially as and for the purpose set forth.

7. In a card-making machine or the like, the combination with the frame, die-plate, and stamping-tool, of an inclined feed-chute leading to the die, a movable tongue for supporting the card-blank in its movement across the die, a movable stop for checking the downward movement of the card-blank preparatory to stamping a section therefrom, and means for actuating said movable tongue, substantially as and for the purpose set forth.

8. In a card-making machine or the like, the combination with the frame, die-plate, and stamping-tool, of an inclined feed-chute leading to the die down which the card-blank gravitates to feed new sections successively beneath the stamping-tool, a stripper over the die-plate, an automatically-operated supporting-plate movable beneath said stripper for supporting the blank in its movement across the die-opening, and an automatically-operated stop for checking the downward movement of the blank preparatory to stamping a card therefrom, substantially as and for the purpose set forth.

9. In a card-making machine or the like, the combination of a frame, inclined die-plate, stamping-tool, inclined feed-chute leading to the die, stripper over the die, automatically-operated tongue movable above the die-opening and beneath the stripper, and an automatically-operated stop for arresting the downward movement of the card-blank preparatory to stamping a card therefrom, comprising a lever provided at one end with a stop and pivoted toward the other end to the frame, a lateral projection at the fore end of said lever, a bell-crank lever pivoted to the frame one arm of which is adapted to engage said lateral projection, and a trip-rod carried by the stamping-tool cross-head for engaging said bell-crank lever on the downstroke to release the stop-carrying lever, and for engaging a projection on said last-mentioned lever on the upstroke to raise the stop, substantially as and for the purpose set forth.

10. In a card-making machine or the like, the combination of a frame, die-plate, stamping-tool, inclined feed-chute leading to the die, and a movable stop for checking the downward movement of the card-blank, comprising a lever pivoted toward one end to the frame and provided at the opposite end with a stop and having toward the center of its length a guide, a spring-controlled slide in said guide, and a trip-rod carried by the cross-head of the stamping-tool and engaging said slide to raise the stop, substantially as and for the purpose set forth.

11. In a card-cutting machine or the like, the combination of a frame, die-plate, stamping-tool, inclined feed-chute leading to the die, stripper, automatically-operated stop, and an automatically-operated supporting-plate movable beneath said stripper operating to guide the card-blank over the die-opening but terminating some distance above the path of the stop, whereby the strip above the last perforation of the card-blank is allowed to drop through and pass beneath the stop to admit a new blank to the machine, substantially as and for the purpose set forth.

12. In a card-cutting machine or the like, the combination of a frame, inclined die-plate and stamping-tool, inclined feed-chute leading to the die, stripper above the die, automatically-operated stop, and an automatically-operated supporting-plate comprising a tongue carried by an actuating-rod slidable in the frame, a spring-controlled bell-crank lever pivoted to the frame one arm of which engages said supporting-rod, and a trip carried by the stamping-tool cross-head to engage the other arm of said bell-crank to move it against the resistance of the spring, substantially as and for the purpose set forth.

13. In a card-cutting machine or the like, the combination of a frame, inclined die-plate and stamping-tool, inclined feed-chute leading to the die, stripper above the die, automatically-operated supporting-plate beneath the stripper, and an automatically-operated stop, comprising a lever provided at one end with a stop and at the other with a lateral projection and between its ends with an upwardly-extending bifurcated guide and pivotally connected near its front end with the frame, a spring-held slide in said guide projecting to the rear of the guide and provided with a sloping rear end, a spring-controlled bell-crank lever pivoted to the frame having its forward-projecting arm provided with a set-screw, a tripping-lever pivoted to the downward-projecting arm of said bell-crank and adjustable by means of said set-screw, a set-screw in the lower arm of said bell-crank to engage said lateral-projecting pin on said first-mentioned lever, and a trip-rod carried by the cross-head of the stamping-tool for operating the stop through the medium of said slide and trip-lever, substantially as and for the purpose set forth.

14. In a card-cutting machine or the like, the combination of a frame having an inclined top, a die supported thereon, detachable housings resting upon said top and extending at right angles thereto, a stamping-tool operatively mounted in the housings, feed-chute-supporting strips resting upon and attached to said top to incline therewith, and a feed-chute upon said supports and substantially parallel with said top, substantially as and for the purpose described.

15. In a card-cutting machine or the like, the combination with the frame, die, and stamping-tool, of a discharge-chute for the cards inclined downwardly and toward one side of the machine, and a collecting-box into which the cards discharge having a shelf provided with a recess to facilitate the removal of the cards, substantially as described.

LOUIS OTTO.

In presence of—
  J. H. LEE,
  R. T. SPENCER.